United States Patent
Kanehira et al.

(10) Patent No.: US 7,303,042 B2
(45) Date of Patent: Dec. 4, 2007

(54) DISPOSITION STRUCTURE OF ENGINE FUNCTIONAL COMPONENTS FOR VEHICLE

(75) Inventors: Takashi Kanehira, Hiroshima (JP); Tsunetoshi Yokokura, Hiroshima (JP); Minoru Shitamori, Hiroshima (JP); Megumi Toyota, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 323 days.

(21) Appl. No.: 11/017,639

(22) Filed: Dec. 22, 2004

(65) Prior Publication Data

US 2005/0155806 A1    Jul. 21, 2005

(30) Foreign Application Priority Data

Jan. 21, 2004    (JP)    ............... 2004-012694

(51) Int. Cl.
    *B60K 1/00*    (2006.01)
(52) U.S. Cl. .................... 180/291; 180/68.1; 180/68.2; 180/68.3
(58) Field of Classification Search ...... 180/68.1–68.3, 180/291, 68.4
    See application file for complete search history.

(56) References Cited

U.S. PATENT DOCUMENTS 5,970,925 A    10/1999    Lakerdas et al.
6,537,338 B2*   3/2003    Inoue et al. ............... 55/385.3
7,000,726 B2*   2/2006    Kobayashi et al. ......... 180/291
7,011,177 B2*   3/2006    Machida et al. ............ 180/284
7,044,848 B2*   5/2006    Wijaya et al. .............. 454/128
2004/0124028 A1* 7/2004   Lachapelle et al. ......... 180/291

FOREIGN PATENT DOCUMENTS

| JP | 60078827 | 5/1985 |
| JP | 07-285347 | 10/1995 |
| JP | 2001-234746 | 8/2001 |
| JP | 2001234746 | 8/2001 |
| JP | 2002-364363 | 12/2002 |

\* cited by examiner

*Primary Examiner*—J. Allen Shriver
*Assistant Examiner*—Katy Meyer
(74) *Attorney, Agent, or Firm*—Nixon Peabody LLP; Donald R. Studebaker

(57) ABSTRACT

There are provided an engine disposed between right and left front side frames provided in an engine room, a radiator disposed obliquely such that its upper end is located forward in a disposition space in front of the engine, an air cleaner disposed above the radiator, and an electronic control device disposed in a space above the radiator and below the air cleaner.

Accordingly, there can be provided a disposition structure of engine functional components for a vehicle which can properly dispose the electronic control device with respective to the radiator and air cleaner, preventing the temperature of the electronic control device from increasing.

9 Claims, 7 Drawing Sheets

DISPOSITION STRUCTURE OF ENGINE FUNCTIONAL COMPONENTS FOR VEHICLE

BACKGROUND OF THE INVENTION

The present invention relates to a disposition structure of engine functional components for a vehicle, such as a radiator and an electronic control device.

In these days, light-weight and compact vehicles have been desired to improve the fuel economy, and a low front nose has been designed for vehicles to reduce the air resistance of vehicle. As a result, since the space of an engine room of vehicles tends to be smaller and shallower, it has become difficult to properly layout the disposition of engine functional components in the engine room.

Japanese Patent Laid-Open Publication No. 2001-234746 discloses an exemplified disposition of the engine, radiator, air cleaner and electronic control device for the vehicle equipped with the slant nose. In this disposition, the radiator is disposed substantially horizontally in front of the engine such that its upper end is located forward, and the air cleaner is located just above the radiator.

Herein, the electronic functional components such as an engine control unit and a power train control module, which are disposed in the engine room, are apt to be caused an functional trouble by an excessively increased temperature of them. However, since these components produce the heat themselves and receive a radiant heat from the engine, there is a concern that these components could not be cooled properly in the engine room.

Thus, the above-described patent publication proposes that the electronic control device be disposed at a portion behind an wheel house located outside a front side frame, which is relatively away from the engine, and an opening hole be formed at the wheel house in front of the electronic control device, so that the outside air can be taken in from the opening hole and the device can be cooled by the air.

However, in the event that the space in the engine room becomes smaller and shallower, there exists a case where an enough space for disposing the electronic control device behind the wheel house disclosed in the above-described publication may not be obtained. In this case, the electronic control device needs to be disposed at another place in the engine room.

Also, there occurs an air flow from the front to the rear in the engine room which is caused by the cooling air from the cooling fan or the outside air during a vehicle driving. Thus, the radiant heat from the engine is apt to stay rearward and upward in the engine room. Accordingly, it is preferable from view points of heat environment in the engine room that the electronic control device is disposed in front of the engine.

However, since there are provided some components such as the radiator, air cleaner, and battery in the space in front of the engine, it is not so easy to provide the space for the electronic control device in front of the engine, particularly in the narrow engine room.

SUMMARY OF THE INVENTION

The present invention has been devised in view of the above-described problem, and an object of the present invention is to provide the disposition structure of engine functional components for the vehicle which can properly dispose the electronic control device with respective to the radiator and air cleaner, preventing the temperature of the electronic control device from increasing.

According to the present invention, there is provided a disposition structure of engine functional components for a vehicle, comprising an engine disposed between right and left front side frames provided in an engine room, a radiator disposed obliquely such that an upper end thereof is located forward in a disposition space which is in front of the engine and between the right-and-left front side frames, an air cleaner disposed in a space above the radiator, an electronic control device disposed in a substantially triangular space, when viewed from the side, which is enclosed by the engine, radiator and air cleaner.

In the above-described structure, the engine is disposed between the right and left front side frames in the engine room, and the radiator, air cleaner and electronic control device are disposed in the space in front of the engine. Herein, the electronic control device means the engine control unit, the power train control module or the like.

And, since the radiator is disposed obliquely such that its upper end is located forward, the height necessary to dispose the radiator in the engine room can be restrained form being high. Also, the air cleaner is disposed above the radiator. Thus, by disposing the radiator and air cleaner side by side, the disposition space in a longitudinal direction of the vehicle can be made compact. As a result, there can be provided a substantially triangular space, when viewed from the side, for properly disposing the above-described electronic control device in it enclosed by the engine, radiator and air cleaner. And, the electronic control device is located in this space. Accordingly, the radiator, air cleaner, and electronic control device can be properly disposed in the engine room.

Also, since the cooling air passing through the radiator creates the air flow from the front to the rear and the air around the engine flows down rearward thereby, the space in front of the engine where the electronic control device is disposed is not apt to receive the radiant heat from the engine.

Accordingly, the radiator, air cleaner and electronic control device can be properly disposed in the relatively small space in front of the engine, even in the vehicle having the shallow engine room equipped with the lower vehicle nose such as the slant nose. Also, the deterioration of function and performance of the electronic control device due to the exposition of the electronic control device to the high-temperature environment can be properly prevented.

According to an preferred embodiment, the above-descried disposition structure of engine functional components further comprises a thermal insulating plate which is disposed between the radiator and air cleaner and attached to a cross member provided between the right-and-left front side frames, and the electronic control device is disposed at a side of the air cleaner with respect to the thermal insulating plate.

The air cleaner is a filter device to take off dusts from the air taken in the engine, and it is preferable that the temperature of air cleaner is prevented from increasing in order to improve the air-charge efficiency of the engine. In the above-described structure, the thermal insulating plate is disposed between the radiator and the air cleaner and electronic control device, and this thermal insulating plate is disposed above the cross member. Thus, the cooling air which has just passed through the radiator is prevented from directly hitting against the air cleaner and electronic control device by the thermal insulating plate.

Herein, the cooling air which has been taken in to the radiator from the outside conducts the heat exchange with the engine coolant flowing in the radiator. Accordingly, the temperature of the cooling air which has just passed through the radiator is not so high as the air temperate around the engine, but is higher than the temperature of the outside air. For this reason, in order to improve further the thermal environment of the air cleaner and electronic control device, it is preferable that the cooling air which has just passed through the radiator does not directly hit against the air cleaner and electronic control device.

According to the above-described preferred embodiment, since the electronic control device and air cleaner are not exposed to the cooling air which has just passed through the radiator and has the higher temperature than the outside air, the increase of temperature of the electronic control device and air cleaner can be prevented more properly.

According to another preferred embodiment, the above-descried disposition structure of engine functional components further comprises a case which encloses a periphery of the electronic control device with a specified space therebetween, and the case is coupled to an air-intake duct for the electronic control device, and the case includes an air exhaust port to exhaust an air coming in the case via the air-intake duct.

In this structure, the electronic control device is located in the above-described case with the specified space therebetween. The electronic control device is protected physically and thermally by this case. And, when the vehicle is driven, the outside air is taken into the case via the air-intake duct for the electronic control device, and then it passes through the electronic control device and is exhausted out of the air exhaust port. Thus, the electronic control device is cooled by the outside air.

Since the electronic control device comprises some heat-generation elements, such as a driver element, it generates a heat itself. And, since the relatively small engine room is occupied by the engine functional components, there exist a partial area in the engine room where the air flow stays and thus cooling is not properly conducted. Herein, according to the above-described preferred embodiment, the electronic control device can be positively cooled by the outside air taken in the case.

Namely, in the above-described preferred embodiment, the outside air having the lower temperature than the air around the engine is taken into the case and the temperature increase of the electronic control device is prevented from increasing more properly by the use of a compulsory air flowing.

According to another preferred embodiment, the above-descried disposition structure of engine functional components further comprises a battery which is disposed in the space above the radiator, and the battery and air cleaner are disposed side by side in a vehicle width direction.

In this structure, the battery can be disposed in the vehicle width direction along with the air cleaner in the space above the radiator which is created by the radiator which is disposed obliquely such that its upper end is located forward. Generally, since the radiator has the greater width than the air cleaner, the space for disposing other components is created at least at one side of the air cleaner in the vehicle width direction above the radiator.

Accordingly, in the above-described preferred embodiment, the battery which is one of relatively large engine functional components in the engine room can be properly disposed in the disposition space in front of the engine like the radiator, air cleaner, and electronic control device.

According to another preferred embodiment, the above-descried disposition structure of engine functional components further comprises an engine coolant reservoir which is disposed closely in front of said battery.

In this structure, the engine coolant reservoir, which is one of relatively large engine functional components in the engine room, can be properly disposed in the disposition space in front of the engine.

According to another preferred embodiment, the above-descried disposition structure of engine functional components further comprises an air-intake duct for the battery which takes in the outside air and supplies it to the battery.

In this structure, the outside air is taken in to the battery via the battery air-intake duct, and the battery can be cooled effectively thereby.

A life of the battery is generally shortened if it is used in a high temperature condition for a long period. Also, since the relatively small engine room is occupied by the engine functional components, there exists the partial area in the engine room where the air flow stays and thus cooling is not properly conducted. Herein, according to the above-described preferred embodiment, the battery can be positively cooled by the outside air taken in to the battery.

Accordingly, in the above-described preferred embodiment, the temperature of the battery can be prevented from increasing by taking in the outside air having the lower temperature than the air around the engine via the battery air-intake duct.

According to another preferred embodiment, the battery is disposed above the cross member provided between the right-and-left front side frames and supported at the cross member.

In this structure, the battery can be supported securely on the cross member.

According to another preferred embodiment, the cross member is located in a middle position in a height direction of the radiator and behind the radiator, the air cleaner and electronic control device are located above the cross member, and a cooling air which has passed through the radiator flows through a space below the cross member toward the engine.

In this structure, the air cleaner and electronic control device (and the battery and engine coolant reservoir) are disposed above the cross member. Namely, an upper half of the space between the radiator and the engine is occupied by the relatively large engine functional components such as the air cleanser. And, the cooling air passing through the radiator flows below the cross member toward the engine located rearward. Thus, at least part of the cooling air which passes through a lower half of the radiator is surely directed to the engine.

Accordingly, in the above-described preferred embodiment, the cooling air passing through the radiator and below the cross member flows around the engine surely, thereby ensuring a proper cooling of the engine.

According to another preferred embodiment, the electronic control device is supported at the cross member via the thermal insulating plate.

In this structure, the electronic control device is disposed properly and securely.

Other features, aspects and advantages of the present invention will become apparent from the following description which refers to the accompanying drawings.

DETAILED DESCRIPTION OF THE INVENTION

Figure 1:
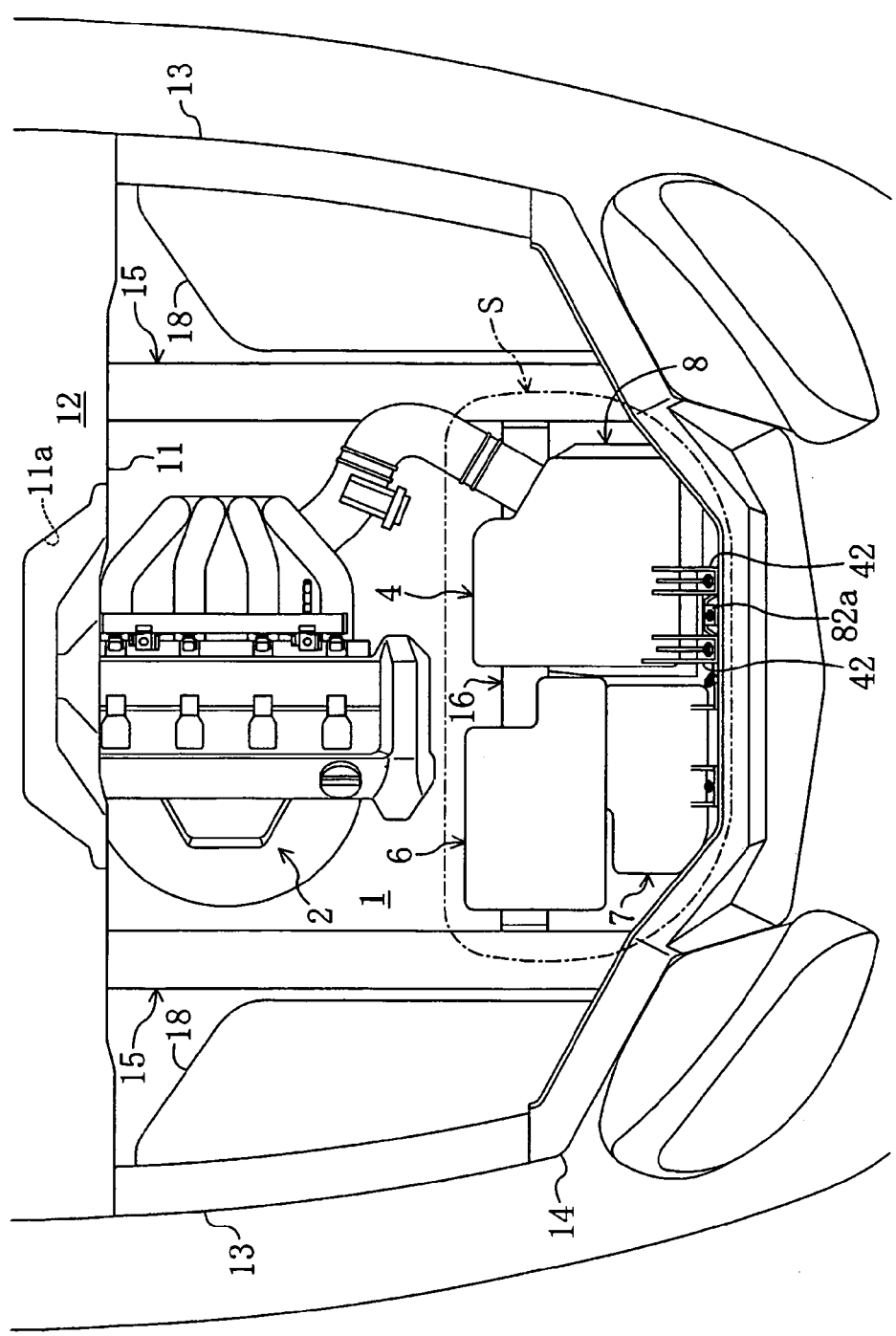
FIG. 1 is an explanatory plan view illustrating an engine room at a vehicle front according to an embodiment of the present invention.

Hereinafter, preferred embodiments will be described referring to the accompanying drawings. It should be understood that even though embodiments are separately described, single features thereof may be combined to additional embodiments.

FIGS. 1 through 4 illustrate a disposition structure of engine functional components for a vehicle according to a preferred embodiment of the present invention. Hereinafter, in the present embodiment, a longitudinal direction of the vehicle will be refereed to as simply the longitudinal direction, and a vertical direction of the vehicle is referred to as simply the vertical direction. Also, the right side of the vehicle heading toward the front will be referred to as the right side of the vehicle, and the left side of the vehicle heading toward the front will be referred to as the left side of the vehicle.

Reference numeral 1 denotes an engine room located at the front of the vehicle, reference numeral 2 denotes an engine disposed longitudinally in the engine room 1, reference numeral 3 denotes a radiator disposed in front of the engine 2, reference numeral 4 denotes an air cleaner disposed in front of the engine 2 and above the radiator 3, and reference numeral 5 denotes an engine control unit (hereinafter, referred to as "ECU") as an electronic control device disposed in front of the engine 2 and between the radiator 3 and the air cleaner 4. Also, reference numeral 6 denotes a battery disposed above the radiator 3 and at the right side of the air cleaner 4, and reference numeral 7 denotes an engine coolant reservoir disposed in front of the battery 6.

At an rear end of the engine room 1 is provided a dash panel 11 which separates a cabin (not illustrated) from the engine room 1 as illustrated in FIG. 1, and a cowl portion 12 is disposed above the dash panel 11. An engine-disposition recess 11a is formed at a central portion of the dash panel 11 so as to project rearward. Also, there are provided apron reinforcements 13, 13 which extend obliquely forward and toward the inside in a vehicle width direction from both end portions of the cowl portion 12. And, there is provided a shroud upper 14 which extends in the vehicle width direction to interconnect front end portions of the right and left apron reinforcements 13, 13.

Also, a pair of front side frames 15, 15 are provided at the right and left sides in the engine room 1 so as to extend in the longitudinal direction and have a specified distance between them in the vehicle width direction. Further, the front side frames 15, 15 are interconnected by a cross member 16, which extends in the vehicle width direction and is comprised of upper and lower members, at a location slightly forward the center of the engine room 1.

Also, in a space between each front side frames 15 and each apron reinforcement 13 is provided a wheel house for front wheel 18 so as to project in the engine room 1. Herein, since the engine room 1 is relatively small, it may be generally difficult to place the ECU 5 in a space between a rear end of the wheel house 18 and the dash panel 11.

Figure 2:
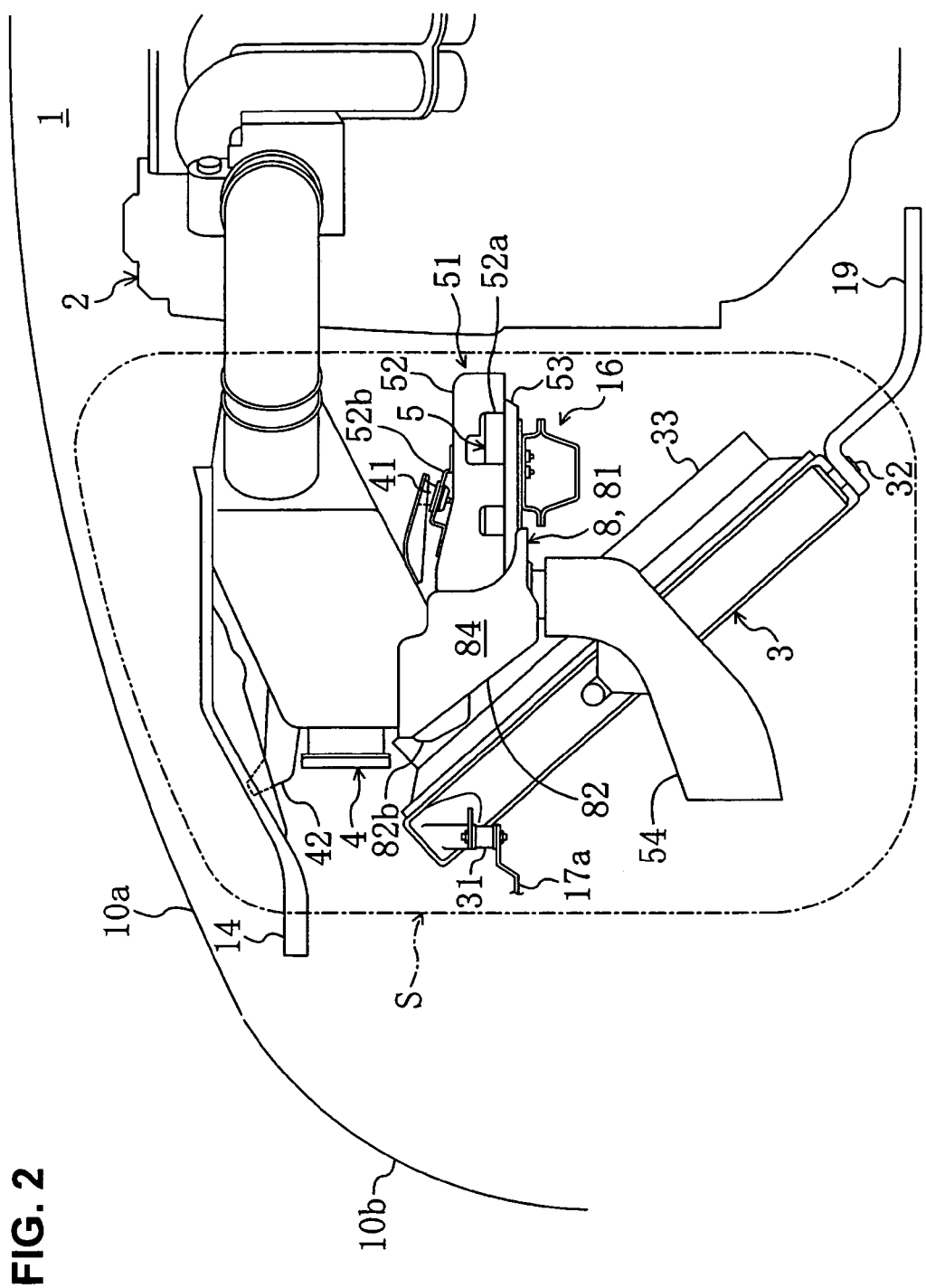
FIG. 2 is an explanatory right side view illustrating the engine room at the vehicle front according to the embodiment of the present invention.
Figure 3:
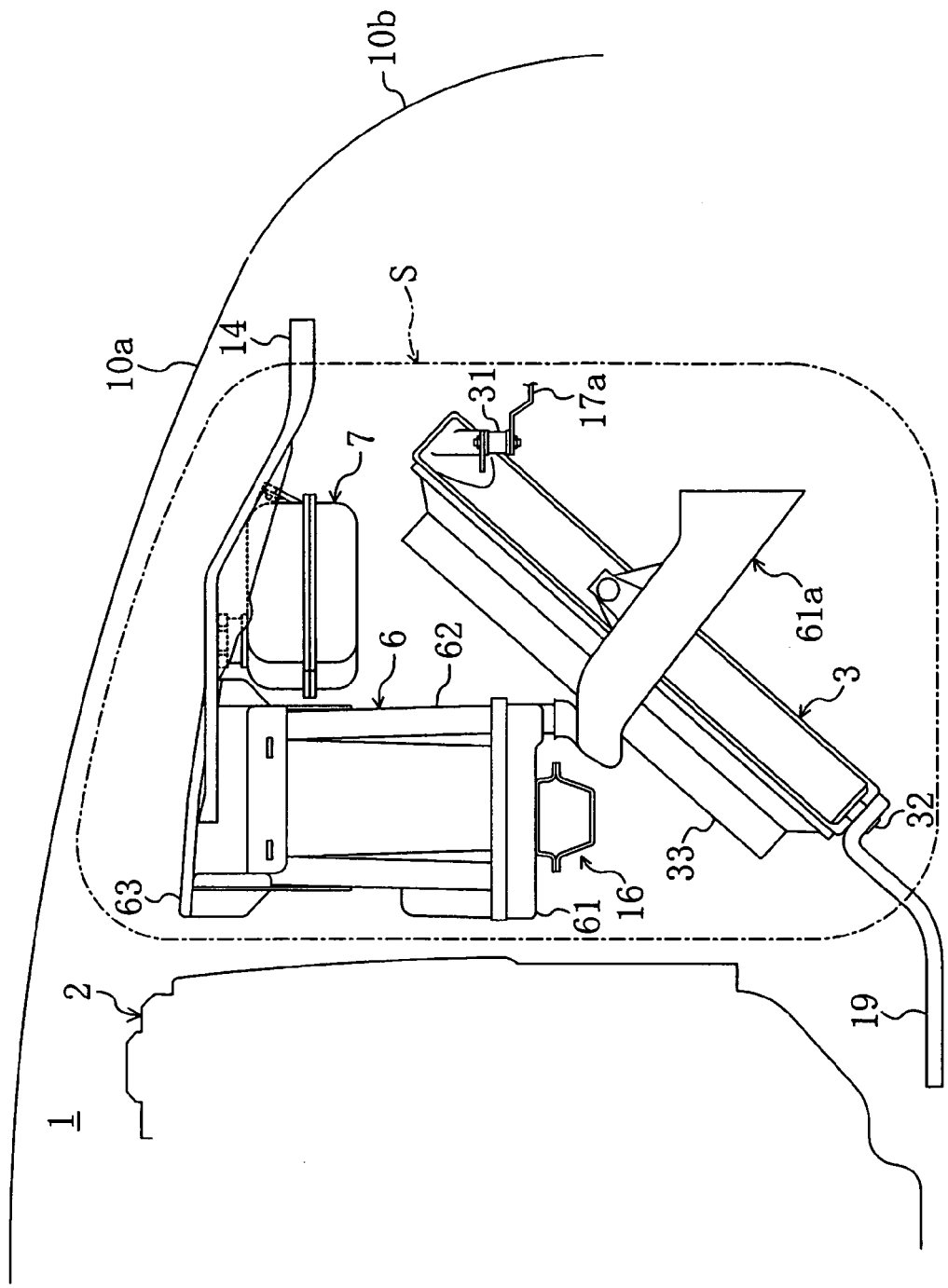
FIG. 3 is an explanatory left side view illustrating the engine room at the vehicle front according to the embodiment of the present invention.

Further, as illustrated in FIGS. 2 and 3, the above portion of the engine room 1 is covered by a front hood 10a so as to open and close. The front hood 10a is provided so as to slant forward and downward. And, a vehicle-body front edge portion 10b which is close to a front end edge of the front hood 10a curves downward near the road surface as a slant nose. Thus, the engine room 1 is configured so as to be relatively shallow.

The engine 2, as illustrated in FIG. 1, is disposed between the right and left front side frames 15 and 15, and a rear end portion of the engine 2 is located in the engine-disposition recess 11a. Thus, since the recess 11a is provided at the central portion of the dash panel 11, the engine 2 can be disposed as rearward as possible and the space in the engine room 1 can be utilized effectively thereby.

Herein, in front of the engine is formed a space S which is enclosed by the front side framed 15 and the shroud upper 14. In the space S, the above-described radiator 3, air cleaner 4, ECU 5, battery 6 and engine coolant reservoir 7 are disposed.

The radiator 3 is disposed obliquely in front of the engine 2 and at a lower portion in the disposition space S as illustrated in FIGS. 2 and 3. The cross member 16 is located in a middle position in the height direction of the radiator 3 and behind the radiator 3. And, upper sides of the radiator 3 are supported at brackets 17a, 17a of a shroud panel (not illustrated) via upper mounts 31, 31. Meanwhile, its lower sides are supported at brackets 19, 19 of a suspension cross member (not illustrated) via the lower mounts 32, 32. Thus, the air cleaner 4 and the like are disposed in a substantially triangular space, when viewed from the side, which is enclosed by the engine 2, the radiator 3 and the front hood 10a.

Also, a cooling fan 33 is disposed just behind the radiator 3. The cooling fan 33 supplies an air to the radiator 3 to obtain a radiation of heat of the radiator 3 and cool the engine and the like even during a vehicle stop state.

As illustrated in FIGS. 1 and 2, the air cleaner 4 is of a substantially box shape and disposed above the radiator 3. Namely, the center of the air cleaner 4 is offset upward from a normal line passing the center of the radiator which is disposed obliquely such that its upper end is located forward. Accordingly, there is provided such a substantially triangular space, when viewed from the side, which is enclosed by the engine 2, the radiator 3 and the air cleaner 4, and there can be provided a proper space enough to mount the above-described ECU 5 in this space. The air cleaner 4 comprises a mount 41 at its lower face and flanges 42, 42 including attaching holes at its front end portions.

Figure 4:
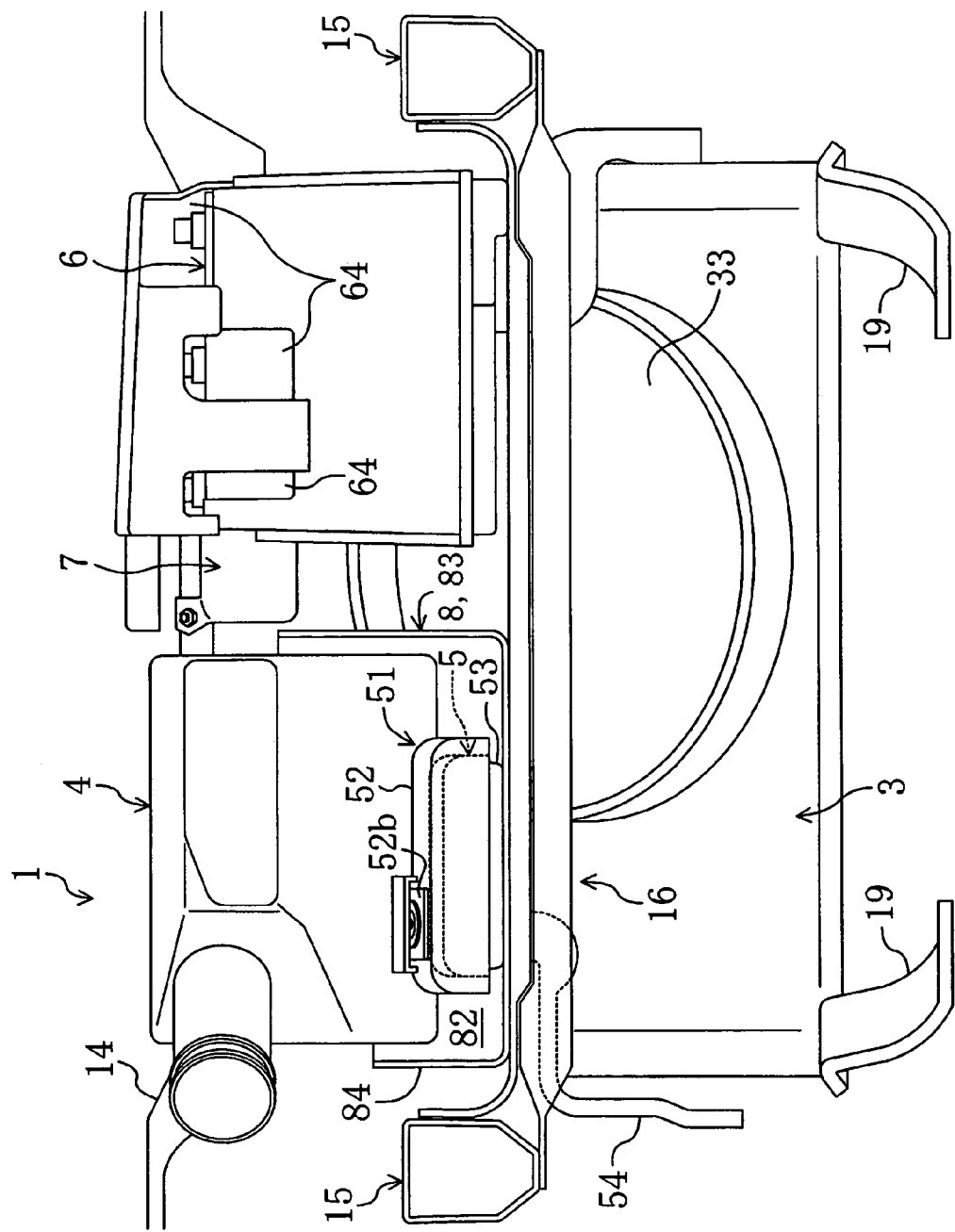
FIG. 4 is an explanatory back side view illustrating a space in front of an engine in the engine room at the vehicle front according to the embodiment of the present invention.
Figure 5:
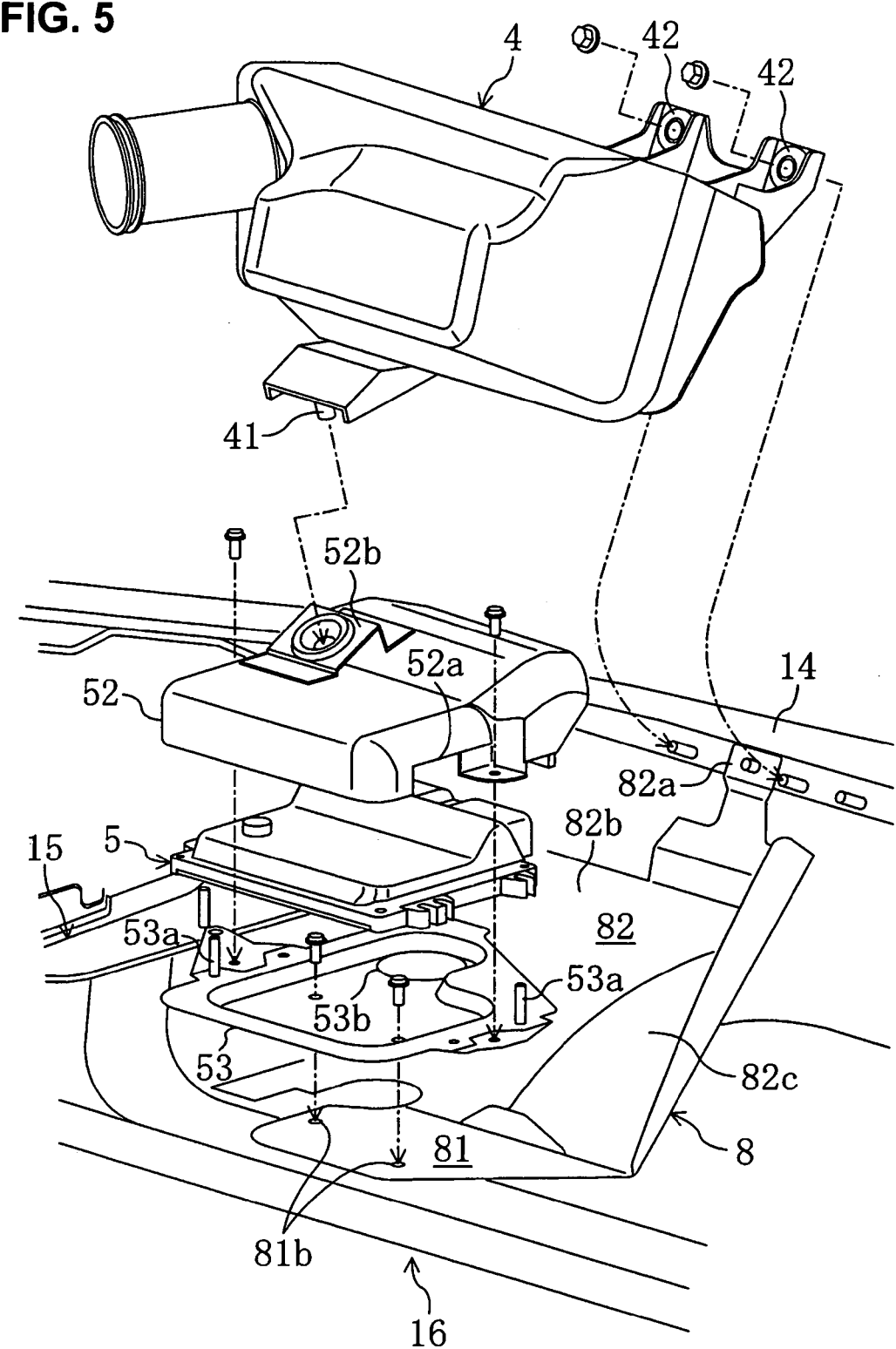
FIG. 5 is an explanatory exploded view illustrating an attachment of an air cleaner, an ECU and an ECU case.

The ECU 5 is a flat and substantially square-shaped unit component, when viewed from the above, as illustrated in FIGS. 2, 4 and 5, and it is disposed above the radiator 3 and below the air cleaner 4. The ECU 5 comprises some heat-generation elements, such as a driver element, which tend to increase the unit temperature, and the improperly increased temperature may cause a trouble to the function of the unit itself. Also, the ECU 5 also increases the temperature by receiving a radiant heat from the engine 2. Thus, it is necessary to properly prevent the temperature of the ECU 5 from increasing. The ECU 5 is covered by an substantially box-shaped ECU case 51 comprising an upper case 52 and a lower case 53 with a specified space therebetween. And, the ECU 5 is fastened to stud bolts 53a, 53a provided at the lower case 53. The lower case 53 includes an opening portion 53b, to which a base end portion of an ECU air-intake duct 54 is coupled. This ECU air-intake duct 54 extends forward passing the left side of the radiator 3, and its end portion opens toward the front of the vehicle. Further, the ECU air-intake duct 54 is fixed to the left-side face of the radiator 3, which prevents the duct 54 from vibrating so as not to make a noise. Meanwhile, at a side face of the upper case 52 is formed an air exhaust port 52a to exhaust the air coming in via the ECU air-intake duct 54. Also, at an upper side face of the upper case 52 is formed a bracket 52b to which the mount 41 of the air cleaner 4 is attached.

A thermal insulating plate 8 is a member to prevent the cooling air passing through the radiator 3 from hitting directly against the air cleaner 4 and the ECU 5. The thermal insulating plate 8 is disposed between the radiator 3 and the ECU 5 and air cleaner 4 as illustrated in FIG. 2, 4 through 6.

Figure 6:
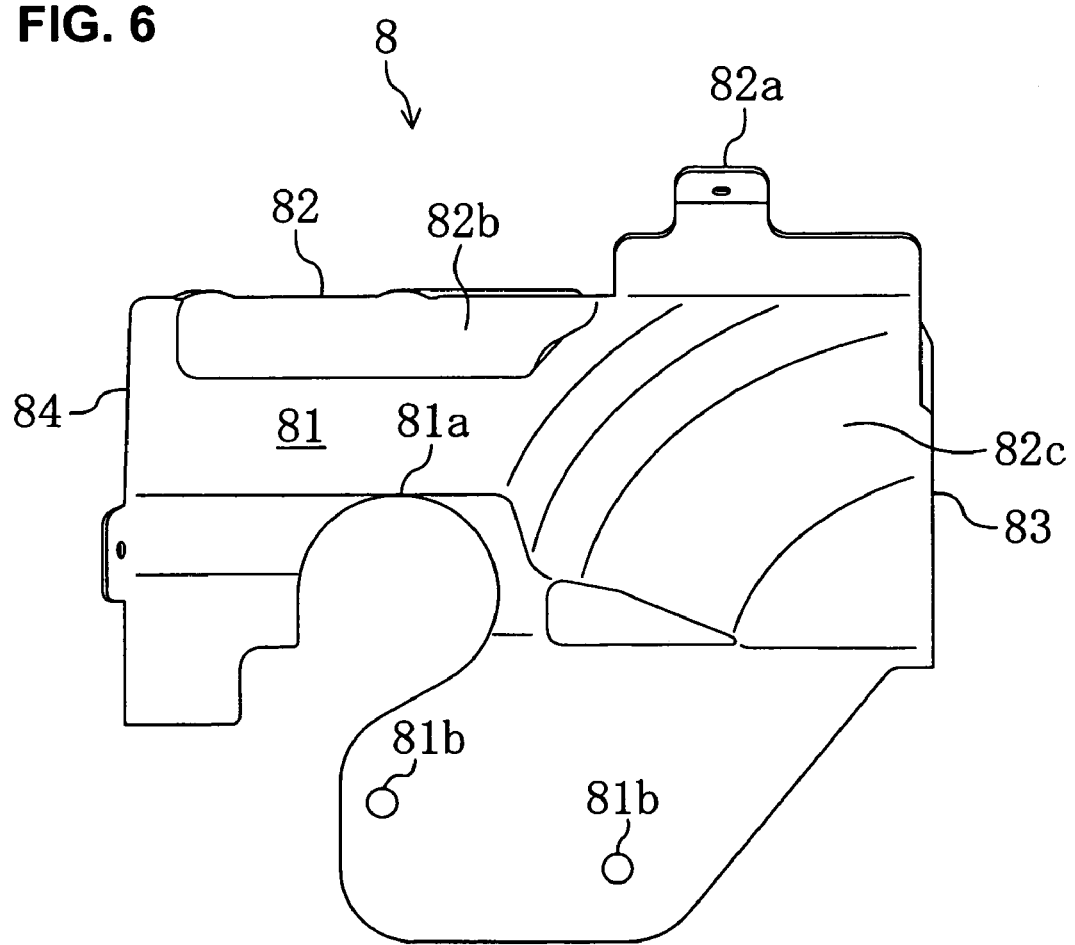
FIG. 6 is a plan view illustrating a thermal insulating plate.

The thermal insulating plate 8 is made of a thin plate comprising a bottom face portion 81, front-side face portion 82, right-side face portion 83 and left-side face portion 84. The bottom face portion 81 has a greater width than the air cleaner 4, and its rear end portion contacts a bottom face of the lower case 53 of the ECU case 51. Further, as illustrated in FIG. 6, the bottom face portion 81 includes through hole 81a, through which the ECU air-intake duct 54 extending from the lower case 53 passes, and fixing holes 81b, 81b for fixing the thermal insulating plate 8 to the cross member.

The front-side face portion 82 extends forward and upward from an front edge of the bottom face portion 81, and covers a front end of the ECU 5 and a lower portion of the front end of the air cleaner 4 to insulate the ECU 5 and air cleaner 4 from the radiator 3. Also, at its upper edge portion is provided an attaching portion 82a which includes an attaching hole to attach the thermal insulating plate 8 to the shroud upper 14. Further, the front-side portion 82 includes a projecting portion 82b which extends forward not so as to interfere with the lower portion of the front end of the air cleaner 4 and a depressed portion 82c which is depressed rearward not so as to interfere with the cooling fan 33.

The right-side face portion 83 extends rearward from the right-side edge portion of the front-side face portion 82 and its lower end portion is continuous to a side of the front end portion of the bottom face portion 81. Also, the left-side face portion 84 extends rearward from the left-side edge portion of the front-side face portion 82 and its lower end portion is continuous to the side of the front end portion of the bottom face portion 81. These right-side face portion 83 and left-side face portion 84 cover the side of the front end of the ECU 5 and the lower portion of the side front end of the air cleaner 4. Herein, since the thermal insulating plate 8 is made of the thin plate, it is preferable that it is reinforced by ribs.

Subsequently, an attachment of the air cleaner 4, ECU 5 and thermal insulating plate 8 will be described in detail. As illustrated in FIG. 5, when the lower case 53 of the ECU case 51 is fixed to the cross member 16, the bottom face portion 81 of the thermal insulating plate 8 is also fastened together via the fixing holes 81b, 81b. Meanwhile, the attaching portion 82a of the front-side face portion 82 is attached to the shroud upper 14. Thus, the thermal insulating plate 8 is attached. Then, the ECU 5 is fastened to the stud bolts 53a, 53a of the lower case 53 fixed on the cross member 16, and the upper case 52 is attached from the above. Thus, the ECU 5 is attached together with the ECU case 51. Further, the air cleaner 4 is attached to the upper case 52 from the above via the mount 41. Also, the flanges 42, 42 of the air cleaner 4 are fixed to the shroud upper 14. Thus, the air cleaner 4 is attached finally.

Figure 7:
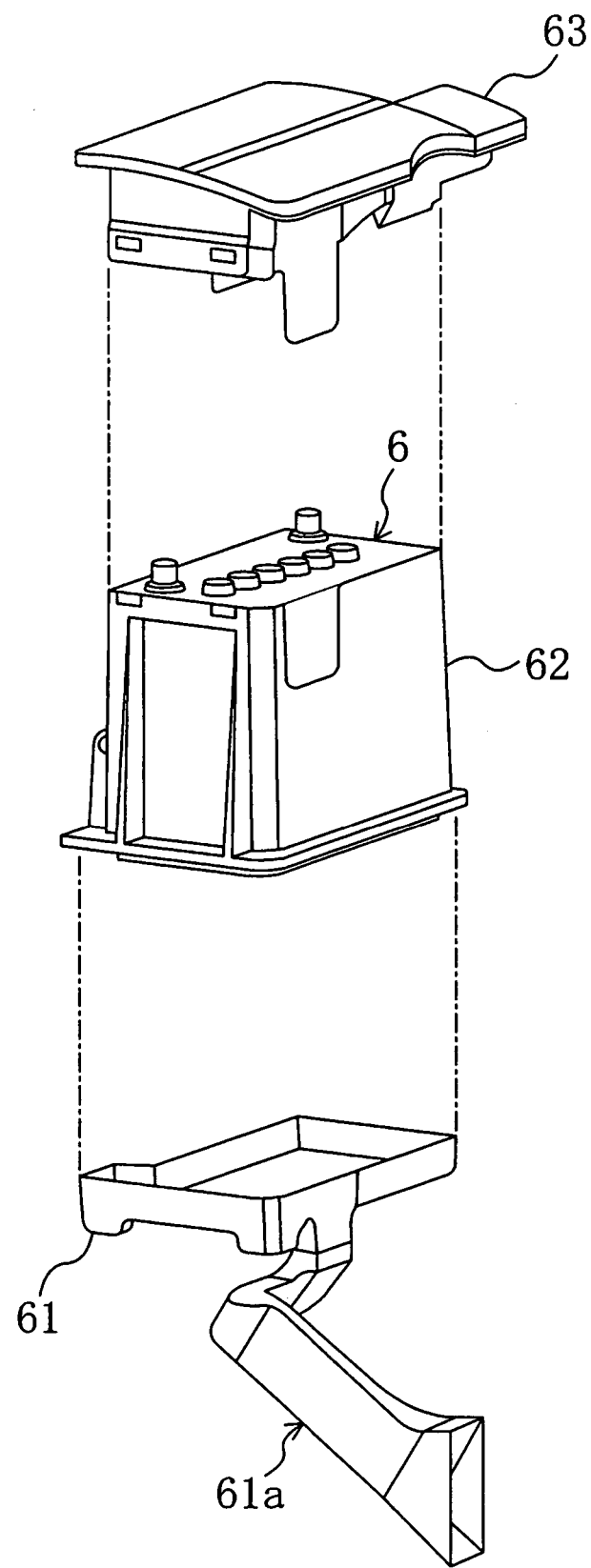
FIG. 7 is an explanatory exploded view illustrating an attachment of a battery and other components located around it.

Next, as illustrated in FIGS. 1, 3 and 4, the battery 6 has its short width in the longitudinal direction compared with the air cleaner 4, and is disposed above the radiator 3 and at the right side of the air cleaner 4. The battery 6 is covered respectively by a tray 61 at its lower portion, by a box 62 at its side faces, and by a cover 63 at its upper portion, as illustrated in FIG. 7. The tray 61 is of a box shape having an open end at its upper portion, which is attached to the cross member 16. And, a base end portion of a battery air-intake duct 61a which takes the air into the tray is coupled to an opening portion formed at a bottom face of the tray 61. As illustrated in FIG. 3, the battery air-intake duct 61a extends forward passing the right side of the radiator 3, and its end portion opens toward the front of the vehicle. Also, the battery air-intake duct 61a is fixed to the right-side face of the radiator 3, which prevents the duct 61a from vibrating so as not to make a noise. The box 62 covers the side faces of the battery 6 with a specified space therebetween. The box 62 is placed on the tray 61 in such a manner that the lower end edge portion of the box 62 contacts the upper end edge portion of the side faces of the tray 61 and these 61 and 62 are engaged with each other. The cover 63 comprises a ceiling plate and four side faces, which covers the battery 6 from above and is engaged with the box 62. And, as illustrated in FIG. 4, there are provided outlets 64 which open rearward at the side faces in a state where the box 62 and the cover 63 are engaged with each other.

The above-described engine coolant reservoir 7 is disposed above the radiator 3 and in front of the battery 6, and the vertical thickness of the reservoir 7 is thinner compared to the battery 6 or the air cleaner 4.

As described above, the present embodiment uses a slant nose at the above-described vehicle-body front edge portion 10b and the engine room 1 which is relatively shallow and narrow. The engine 2 is disposed as rearward as possible in the engine room 1, and there is provided the disposition space S in front of the engine 2 thereby. The disposition space S is configured so as to be relatively shallow and narrow as well as the engine room 1 (see FIGS. 1 through 3).

Herein, by disposing the radiator 3 obliquely in this disposition space S such that its upper end is located forward as illustrated in FIG. 2, the height necessary to dispose the radiator 3 in the engine room 1 can be restrained from being high. Thus, the substantially triangular space, when viewed from the side, is formed by the front end face of the engine 2, the front hood 10a and the radiator 3, and the engine functional components, such as the air cleaner 4 and the ECU 5, are disposed in this space.

Further, since the air cleaner 4 is disposed above the radiator 3, the substantially triangular space, when viewed from the side, is formed by the front end face of the engine 2, the radiator 3 and the air cleaner 4. Herein, the ECU 5 is disposed in this space, and thus the radiator 3, air cleaner 4 and ECU 5 are disposed in this narrow disposition space S properly.

Also, when the vehicle is driven or the cooling fan 33 at the radiator 3 is driven, the cooling air is supplied to the radiator 3, and then the cooling air passing through the radiator 3 flows down in the engine room 1 and cools the engine 2 located rearward in the engine room 1. Herein, the cooling air cools the engine coolant flowing in the radiator 3, and then the cooling air cools the engine 2. Namely, there occurs an air flow from the front to the rear in the engine room 1, and the heat is apt to stay around the rear in the engine room 1. Accordingly, the above-described disposition space S located in front of the engine 2 is more appropriate as the space for disposing the components such as the ECU 5 which are sensitive to the heat than a space located at the rear in the engine room 1 from view points of heat environment. Thus, the ECU 5 and the air cleaner 4 disposed in front of the engine 2 will not exposed to the heat with a high temperature.

There is a type of fan as the cooling fan 33 in which the temperature of the engine coolant or the like is detected and the fan is driven only when the detected temperature is higher than a specified temperature, instead of the fan being driven all the time. In this type, there occurs no air flow from the front to the rear in the engine room 1 when the vehicle stops and the detected temperature of the engine coolant or the like is lower than the specified temperature. This state means that it is not necessary to cool the engine coolant or the like, i.e., the temperature in the engine room 1 does not increase so high, and therefore no air flow from the front to the rear in the engine room 1 may not cause any serious problem to the air cleaner 4 and the ECU 5. Meanwhile, when the detected temperature is higher than the specified temperature, the fan is driven. As a result, as described above, the air flow occurs from the front to the rear, and the thermal environment around the air cleaner 4 and the ECU 5 can be improved thereby. Herein, the front hood 10a covering the engine room 1 is designed so as to slant in such a manner that its rear portion is located higher than its front portion, as illustrated in FIGS. 2 and 3. Accordingly, the air heated by the engine naturally rises and flows rearward along the front hood. Thus, even if the vehicle stops, there naturally occurs the air flow from the front to the rear in the engine room, and the thermal environment around the air cleaner 4 and the ECU 5 is improved thereby.

Further, as illustrated in FIG. 2, since the air cleaner 4 and the ECU 5 are located between the radiator 3 and the engine 2, they are hit against directly by the cooling air passing through the radiator 3 generally. The temperature of the cooling air which has just passed through the radiator 3, as described above, is not so high as the temperature around the engine 2, but it becomes higher than that of the outside air. Accordingly, by disposing the thermal insulating plate 8 between the radiator 3 and the ECU 5 and air cleaner 4, it is prevented that the cooling air having the higher temperature than the outside air hits directly against the ECU 5 and air cleaner 4.

Herein, this ECU 5, which is protected physically and thermally by the ECU case 51, is the component which produces the heat itself and is located in the narrow space in the engine room 1 where many components are located and the air is apt to stay. Accordingly, it is preferable that the ECU 5 is positively cooled. Thus, when the vehicle is driven, the air is taken into the ECU case 51 from the front of vehicle via the above-described ECU air-intake duct. Specifically, this air is taken into the ECU case 51 through the opening portion 53b of the lower case 53, and then it passes through between the ECU case 51 and the ECU 5 and is exhausted out of the air exhaust port 52a into the engine room 1. Thus, the ECU 5 is cooled. Herein, since the air taken into the ECU case 51 passes through between the ECU 5 and the ECU case 51 and thus relatively near the ECU 5, the cooling efficiency improves.

Thus, according to the present embodiment, even if, for example, the slant nose is used and the engine room 1 is relatively shallow and narrow, the radiator 3, air cleaner 4 and ECU 5 can be properly disposed in the disposition space S in front of the engine 2.

Further, since the ECU 5 is located in front of the engine 2 where the thermal environment is relatively preferable, the ECU 5 can be properly prevented from increasing its temperature.

Additionally, by disposing the thermal insulating plate 8 between the radiator 3 and the ECU 5 and air cleaner 4, the cooling air which has just passed through the radiator 3 and has the higher temperature than the outside air can be prevented from hitting directly against the ECU 5 and air cleaner 4. Thus, the thermal environment around the ECU 5 and air cleaner 4 can be further improved.

Further, by covering the ECU 5 by the case 51 and by taking the outside air into the case 51, the ECU 5 generating the heat itself can be positively cooled.

The battery 6 is disposed above the radiator 3 and at the right side of the air cleaner 4 as illustrated in FIGS. 1 and 4, and the engine coolant reservoir 7 is disposed above the radiator 3 and in front of the battery 6. The radiator 3 has the greater lateral width than the air cleaner 4 and battery 6. Accordingly, by disposing the air cleaner 4 above the radiator 3, there exists a space for disposing other components beside the air cleaner 4. Thus, by disposing the battery in this space, the space above the radiator 3 can be properly utilized in the vehicle width direction. Also, the longitudinal with of the air cleaner 4 is longer than that of the battery 6. Accordingly, disposing the battery 6 at one side (at the right side in the present invention) of the air cleaner 4 creates a space for disposing other components at least at one side of the battery 6 in the longitudinal direction. Thus, by disposing the engine coolant reservoir 7 with relatively a small height in front of the battery 6, the space above the radiator 3 and beside the air cleaner 4 can be properly utilized in the longitudinal direction.

Thus, the battery 6 and the engine coolant reservoir 7 are properly disposed in the above-described disposition space S. Also, since the tray 61 for the battery 6 is attached to the cross member 16, the battery 6 can be securely supported.

Also, the tray 61 carrying the battery 6 takes in the outside air via the battery air-intake duct 61a. This outside air passes through between the battery 6 and the box 62, and then flows into the engine room 1 via the outlet 64 formed by the cover 63 and the box 62. Thus, the battery 6 can be cooled. Herein, since the outside air taken into the tray 61 passes through between the box 62 and the battery 6 and thus relatively near the battery 6, the cooling efficiency improves.

Accordingly, by taking in the outside air via the battery air-intake duct 61a, the battery 6 can be positively cooled. Thus, the life of the battery 6 can be prevented from being shortened.

Also, as illustrated in FIG. 4, the cross member 16 is located in the middle position in the height direction of the radiator 3 and behind the radiator 3. And, the air cleaner 4, ECU 5, battery 6 and engine coolant reservoir 7 are located above the cross member 16. Namely, the upper half of the space between the radiator 3 and the engine 2 is occupied by the engine functional components such as the air cleanser 4. Meanwhile, such relatively large engine functional components are not provided in the lower half of the space, and only relatively small components such as a pipe and harness are located in it. Accordingly, the part of cooling air passing through the radiator 3 and flowing into the upper half of the space is guided below the cross member 16 by the thermal insulating plate 8, whereas the part of cooling air flowing into the lower half of the space passes through below the cross member straightly. Thus, the cooling air passing through the radiator 3 is apt to flow down to the engine 2. Namely, the cooling air is directed to the engine surely, and the proper cooling of the engine 2 can be ensured thereby.

The present invention should not limited to the above-described embodiment, but any other modifications and improvements may be applied within the scope of a sprit of the present invention. For example, the ECU 5 is used as the electronic control device in the above-described embodiment, but the similar disposition can be used for any other electronic control devices such as a power train control module as well.

Also, although the slant nose is used as the vehicle-body front edge portion 10a in the present embodiment, the other type of nose may be used. Herein, the present invention can be applied more properly to such a vehicle in which the front nose is designed so as to be located in relatively low position and the engine room is shallow thereby.

Also, although the air cleaner 4 is disposed at the left side and the battery 6 is disposed at the right side above the radiator 3 in the present embodiment, these disposition sides may be changed to each other. In this case, the position of the ECU 5 and engine coolant reservoir 7 may be changed to each other accordingly. Also, not only the battery 6 but also any other engine functional components may be disposed beside the air cleaner 4.

Further, although the battery 6 is covered by the tray 61, box 62 and cover 63 in the present embodiment, any structure is applied as long as the out side air is directed to the battery 6 via the battery air-intake duct 61a.

Also, two cooling fans may be disposed at the right and left sides instead one cooling fan 33.

What is claimed is:

1. A disposition structure of engine functional components for a vehicle, comprising:
    an engine disposed between tight and left front side frames provided in an engine room;
    a radiator disposed obliquely such that an upper end thereof is located forward in a disposition space which is in front of said engine and between said right-and-left front side frames;
    an air cleaner disposed in a space above said radiator; and
    an electronic control device disposed in a substantially triangular space, when viewed from the side, which is enclosed by said engine, radiator and air cleaner,
    wherein said electronic control device is accommodated in a substantially-closed case which encloses a periphery of the electronic control device with a specified space therebetween, and said case includes an air-intake duct to take an outside air therein for cooling the electronic control device and an air exhaust port to exhaust the air taken via the air-intake duct, the air-intake duct extending forward passing a side of the radiator so that a front end thereof opens at a location in front of the radiator in a vehicle longitudinal direction.

2. The disposition structure of engine functional components for a vehicle of claim 1, further comprising a thermal insulating plate which is disposed between said radiator and air cleaner and attached to a cross member provided between said right-and-left front side frames, wherein said case of the electronic control device is disposed at a side of said air cleaner with respect to said thermal insulating plate.

3. The disposition structure of engine functional components for a vehicle of claim 2, wherein said case of the electronic control device is supported at said cross member via said thermal insulating plate.

4. The disposition structure of engine functional components for a vehicle of claim 2, wherein said cross member is located in a middle position in a height direction of said radiator and behind the radiator, said air cleaner and case of the electronic control device are located above said cross member, and a cooling air which has passed through said radiator flows Through a space below said cross member toward said engine.

5. The disposition structure of engine functional components for a vehicle of claim 1, further comprising a battery which is disposed in said space above the radiator, wherein said battery and air cleaner are disposed side by side in a vehicle width direction.

6. The disposition structure of engine functional components for a vehicle of claim 5, further comprising an engine coolant reservoir which is disposed closely in front of said battery.

7. The disposition structure of engine functional components for a vehicle of claim 5, further comprising an air-intake duct for said battery which takes in and supplies an outside air to said battery.

8. The disposition structure of engine functional components for a vehicle of claim 5, wherein said battery is disposed above a cross member provided between said right-and-left front side frames and supported at said cross member.

9. The disposition structure of engine functional components for a vehicle of claim 8, wherein said cross member is located in a middle position in a height direction of said radiator and behind the radiator, said air cleaner and case of the electronic control device are located above said cross member, and a cooling air which has passed through said radiator flows through a space below said cross member toward said engine.

* * * * *